US010800477B2

(12) United States Patent
Shang

(10) Patent No.: US 10,800,477 B2
(45) Date of Patent: Oct. 13, 2020

(54) SELF-BALANCING SCOOTER

(71) Applicant: Yanyan Shang, Shenzhen (CN)

(72) Inventor: Yanyan Shang, Shenzhen (CN)

(*) Notice: Subject to any disclaimer, the term of this patent is extended or adjusted under 35 U.S.C. 154(b) by 193 days.

(21) Appl. No.: 16/071,491

(22) PCT Filed: Jun. 6, 2016

(86) PCT No.: PCT/CN2016/084966
§ 371 (c)(1),
(2) Date: Jul. 20, 2018

(87) PCT Pub. No.: WO2017/210830
PCT Pub. Date: Dec. 14, 2017

(65) Prior Publication Data
US 2019/0023344 A1  Jan. 24, 2019

(51) Int. Cl.
*B62K 11/00* (2006.01)
*B62K 11/02* (2006.01)
(Continued)

(52) U.S. Cl.
CPC .......... *B62K 11/007* (2016.11); *A63C 17/014* (2013.01); *A63C 17/12* (2013.01); *B62J 6/015* (2020.02); *B62J 25/00* (2013.01); *B62K 11/02* (2013.01); *A63C 17/08* (2013.01); *B62K 2202/00* (2013.01)

(58) Field of Classification Search
CPC .... B62K 11/02; B62K 11/007; B62K 2202/00
See application file for complete search history.

(56) References Cited

U.S. PATENT DOCUMENTS

D817,811 S  * 5/2018 Wang ............................... D12/1
10,421,006 B1 * 9/2019 Li ........................... A63C 17/011
(Continued)

FOREIGN PATENT DOCUMENTS

CN  104029769 A  9/2014
CN  205059826 U  3/2016
(Continued)

OTHER PUBLICATIONS

Qing He, the International Searching Authority written comments, Feb. 2017, CN.
Qing He, The International Search Report, Feb. 2017, CN.

*Primary Examiner* — Tony H Winner

(57) ABSTRACT

The present invention discloses a self-balancing scooter. The scooter body includes: an upper shell, pedals, a middle shell and a lower shell. The upper shell includes a first upper shell and a second upper shell disposed symmetrically. The first upper shell and the second upper shell are provided with pedal holes respectively. Two pedals are disposed in the pedal holes of the first upper shell and the second upper shell respectively. The middle shell includes a first middle shell and a second middle shell disposed symmetrically and rotatable mutually. The lower shell includes a first lower shell and a second lower shell disposed symmetrically. The middle shell is located between the upper shell and the lower shell. The lower shell is provided with a depression. A plurality of horizontal and spaced strip-shaped ribs are disposed on the lower shell on an outer surface of the depression.

16 Claims, 5 Drawing Sheets

(51) Int. Cl.
*A63C 17/01* (2006.01)
*B62J 25/00* (2020.01)
*B62J 6/015* (2020.01)
*A63C 17/12* (2006.01)
*A63C 17/08* (2006.01)

(56) References Cited

U.S. PATENT DOCUMENTS

| | | |
|---|---|---|
| 2013/0238231 A1 | 9/2013 | Chen |
| 2016/0129963 A1* | 5/2016 | Ying ............... B62K 11/007 180/6.5 |
| 2017/0183053 A1* | 6/2017 | Zeng ................ B60K 1/04 |
| 2017/0217529 A1* | 8/2017 | Chen ............... B62K 11/007 |
| 2018/0037293 A1* | 2/2018 | Chen ............... B62K 11/007 |
| 2018/0127048 A1* | 5/2018 | Li ..................... B62M 7/12 |
| 2019/0077479 A1* | 3/2019 | Chen ............... B62K 11/007 |
| 2019/0382065 A1* | 12/2019 | Shang .............. B62J 99/00 |

FOREIGN PATENT DOCUMENTS

| | | |
|---|---|---|
| CN | 205273742 U | 6/2016 |
| CN | 105857456 A | 8/2016 |
| CN | 105857457 A | 8/2016 |
| CN | 105857467 A | 8/2016 |
| CN | 105857476 A | 8/2016 |
| CN | 105857500 A | 8/2016 |
| CN | 105923083 A | 9/2016 |
| CN | 106043529 A | 10/2016 |

* cited by examiner

SELF-BALANCING SCOOTER

TECHNICAL FIELD

The present invention relates to the field of two-wheel balancing scooters, and more particularly to a self-balancing scooter.

BACKGROUND

A self-balancing scooter, also called as a somatosensory scooter and a thought scooter, has an operation principle based on a basic principle of "dynamic stabilization", detects the change of scooter body attitudes through gyroscope and an acceleration sensor inside a scooter body, and accurately drives a motor to perform corresponding regulation through a servo control system so as to keep balance of a system.

Existing self-balancing scooters are generally classified into two types. The first type is as follows: the scooter body has an operating lever. A user stands on a pedal platform of the self-balancing scooter to operate the operating lever so as to advance, withdraw and stop. Such control is also called as "hand control". The other type is as follows: the scooter body is composed of two portions. A left portion and a right portion realize mutual rotation through a rotating mechanism, so as to realize "foot control". See a self-balancing swing scooter of a Chinese invention patent with a publication number CN104029769A (publication date: Sep. 10, 2014). According to the description and drawings, after a thickness of a shell is set, the strength is increased.

SUMMARY

The purpose of the present invention is to provide a self-balancing scooter with portion of a shell not thickened.

The purpose of the present invention is achieved by the following technical solution:

The present invention discloses a self-balancing scooter, comprising a scooter body, wheels, a driving motor for driving the wheels, a power supply for providing power, a circuit board provided with a sensor, and a controller. The controller is electrically connected to the circuit board, the power supply and the driving motor respectively, wherein the scooter body comprises:

an upper shell comprising a first upper shell and a second upper shell disposed symmetrically and provided with pedal holes respectively;

two pedals disposed in the pedal holes of the first upper shell and the second upper shell respectively;

a middle shell comprising a first middle shell and a second middle shell disposed symmetrically and rotatable mutually; and a lower shell comprising a first lower shell and a second lower shell disposed symmetrically, wherein the middle shell is located between the upper shell and the lower shell. An outer surface of the middle of the lower shell is provided with a depression with an arc structure. A plurality of horizontal and spaced strip-shaped ribs are disposed on the lower shell on an outer surface of the depression.

The wheels are provided with rotating shafts. The two wheels are respectively fixed to both sides of the middle shell through the rotating shafts, and are rotatable around the middle shell.

Preferably, heights of the strip-Shaped ribs are lower than the height of the depression. The strip-shaped ribs are prevented from protruding out of the depression. In this way, a distance from the middle of the self-balancing scooter to the running ground is longer, so as to facilitate the self-balancing scooter to run and effectively prevent the self-balancing scooter from touching an obstacle during running.

Preferably, a width of the depression is gradually decreased from the middle of the lower shell to positions of both sides. Such arrangement ensures that the distance from the middle position located below the scooter body to the ground is longer and the effect of preventing the self-balancing scooter from touching the obstacle is better.

Preferably, the depression on the lower shell extends to the side portion of the upper shell, and the strip-shaped ribs are also disposed on the upper shell at the extending position of the depression of the lower shell. The depression extends to portion of the upper shell. In this way, the user holds the self-balancing scooter with hands more conveniently. In a holding process, the hands of the user hold the middle position of the lower shell. Thumb portions and middle finger portions extend to the middle position of the upper shell. In this way, the strip-shaped ribs are also disposed in the middle position of the upper shell so that the user holds the self-balancing scooter with hands more conveniently.

Preferably, sizes of the positions in which the strip-shaped ribs are disposed on the upper shell are smaller than sizes of the positions in which the strip-shaped ribs are disposed on the lower shell. Such arrangement ensures that the strip-shaped ribs fit hand shapes of the user.

Preferably, the sizes of the positions in which the strip-shaped ribs are disposed on the scooter body are gradually increased from the middle position to the positions of both sides of the strip-shaped ribs. Such arrangement ensures that the position closer to the middle has a larger height from the ground in the self-balancing scooter. Thus, the effect of preventing the self-balancing scooter from touching the obstacle is better.

Preferably, top surfaces of the strip-shaped ribs are configured into arc structures. The arc structures are convenient for the user to hold and avoid injuring the hands of the user.

Preferably, the self-balancing scooter further comprises a light emitting lamp. The scooter body further comprises a lampshade sleeved around the light emitting lamp. The lampshade is provided with at least two spaced lamp strips for transmitting light. Correspondingly, the scooter body is provided with lamp holes for placing the lamp strips. A quantity of the lamp holes is identical with a quantity of the lamp strips. Thus, the scooter body of the present invention has at least two lamp holes when one lampshade is installed and fixed on the scooter body. Compared with a structure in which one lamp hole is formed to match with one lampshade, the present invention uses at least two lamp holes to place the lamp strips so that the size of a single lamp hole is decreased. In this way, at least two lamp holes are matched with the lamp strips. Thus, at least two lamp holes share an acting force used to install and fix the lampshade. Further, matching between a single lamp strip and a single lamp hole is tight. At least two lamp holes and lamp strips are fixed tightly, so that the lampshade is installed and fixed on the scooter body more firmly and is difficult to swing.

Preferably, the upper shell is provided with lamp holes for placing one or at least two lamp strips. The lower shell is provided with lamp holes for placing one or at least two lamp strips. The sum of the lamp holes of the upper shell and the lamp holes of the lower shell is identical with the quantity of the lamp strips. The lamp holes are respectively formed in the upper shell and the lower shell in the present invention. Thus, when a single lampshade is fixed, the lamp strips on the single lampshade are simultaneously placed into the lamp holes of the upper shell and the lamp holes of the lower shell. In this way, the lampshade plays a role of connecting the upper shell and the lower shell, so that connection between the upper shell and the lower shell is tighter and fixation is more firm.

Preferably, the lamp strips are convex strip-shaped structures of the lampshade. The lamp holes are configured to adapt to sizes of the lamp strips. The lamp strips are configured into the convex strip-shaped structures to facilitate disposal of the lamp holes with the strip-shaped structures. In this way, the lamp strips of the strip-shaped structures and the lamp holes of the strip-shaped structures are conveniently installed and matched. In addition, a matching and limiting effect of the lamp strips of the strip-shaped structures and the lamp holes of the strip-shaped structures is good, so that the lampshade has a better fixed connection and tightening effect for the upper shell and the lower shell.

Preferably, chamfers are formed at tops of the lamp strips. The lamp strips are conveniently inserted into the lamp holes.

Preferably, sizes of the lamp strips from the tops to roots are gradually increased. The sizes of the roots of the lamp strips adapt to the sizes of the lamp holes. The lamp strips are conveniently inserted into the lamp holes. Connection between the lamp strips and the lamp holes is tight, so as to avoid generating a clearance.

Preferably, the lampshade comprises a first plate, a second plate and an angle portion located between the first plate and the second plate. An angle of the angle portion is smaller than 180 degrees and greater than 90 degrees. The lamp strips are located on the first plate and the second plate. The lamp strips on the first plate are placed in the lamp holes of the upper shell. The lamp strips on the second plate are placed in the lamp holes of the lower shell. This is a specific structure for arrangement of the lampshade in the present invention. Such arrangement enables intensity of the lampshade to be large. Moreover, when the upper shell is connected to the lower shell in a matching manner, a radian is formed between the upper shell and the lower shell. In the present invention, the lampshade is configured into an integral structure suitable for connection between the upper shell and the lower shell in a matching manner. Thus, the lampshade is conveniently connected to the upper shell and the lower shell respectively in a matching manner. When connected to the upper shell and the lower shell respectively in a matching manner, the lampshade is tightly matched and the fixed connection effect is better.

Preferably, an angle greater than or equal to 0 degree and smaller than 90 degrees is formed between the lamp strips and angle portion. At least two lamp strips are located on the first plate. At least two lamp strips are located on the second plate. A quantity of the lamp strips on the first plate is identical with a quantity of the lamp strips on the second plate. Because the quantity of the lamp strips located on the first plate is identical with the quantity of the lamp strips located on the second plate, the upper shell and the lower shell bear uniform stress.

Preferably, the lamp strips on the first plate and the lamp strips on the second plate are disposed symmetrically. Symmetrical arrangement ensures uniform stress.

Preferably, one end of the angle portion between the first plate and the second plate protrudes outwards, and the other end sinks inwards. The other end is close to a middle of the scooter body. The convex end of the lampshade is larger than the other end, and is gradually decreased. Because the middle of the scooter body is smaller than the sizes of both sides of the scooter body such arrangement ensures that the lampshade is disposed to match with a scooter body structure and the lampshade has a better connection effect for the upper shell and the lower shell and larger intensity.

Preferably, at least two lamp strips are located on the first plate. At least two lamp strips are located on the second plate. A length of the lamp strips on the first plate is gradually increased from the convex end to the other end. A length of the lamp strips on the second plate is gradually decreased from the convex end to the other end. A change amplitude of the length of the lamp strips on the second plate is greater than a change amplitude of the length of the lamp strips on the first plate. The upper shell is located in a position at the top of the scooter body. Because the pedal holes are formed in the middles of the first upper shell and the second upper shell of the upper shell, the lamp holes in the present invention are formed at edges of the first upper shell or/and the second upper shell. The change of the edge of the upper shell is small. In this way, a change amplitude of the length of the lamp holes formed in the upper shell is small. Meanwhile, the lower shell is located at the bottom of the scooter body. The middles of the first lower shell and the second lower shell of the lower shell are used to place the power supply, the controller and other devices. The middles protrude greatly outwards, so that the lamp holes with small length are disposed in the middle of the lower shell close to the scooter body and the lamp holes with large length in the lamp holes of the lower shell are conveniently presented, so that a user sees light emitted from the lamp holes.

Preferably, a size of one end, close to the angle portion, of the lamp strips is larger than a size of the other end of the lamp strips. The lampshade in the present invention connects the upper shell and the lower shell through the lamp strips on the first plate and the second plate. When an outward tension is applied between the upper shell and the lower shell, one end, close to the angle portion, of the lamp strips is stressed. However, in the present invention, one end close to the angle portion is configured to be larger than the other end of the lamp strips. Thus, the lamp strips on the stressed end are larger, have stronger bearing capacity and realize better connection between the upper shell and the lower shell.

Preferably, two light emitting lamps are disposed, and two lampshades are disposed. The two lampshades are respectively matched with the two light emitting lamps. The two lampshades are disposed symmetrically.

Preferably, the driving motors are hub motors. Two hub motors respectively disposed in the two wheels.

Compared with the prior art, the present invention has the following technical effects: a driving mechanism is disposed in the middle of the scooter body, and portions of the upper shell and the lower shell in the middle of the scooter body are used to cover the driving mechanism without needing large strength, so that an arc depression adapted to the scooter body structure is disposed in the middle position of the lower shell in the present invention. In this way, the size of the middle of the scooter body is decreased. Not only the user conveniently holds the scooter body with hands, but also a height from the middle of the scooter body to the ground is increased relatively, so as to better prevent the self-balancing scooter from touching an obstacle during running. In addition, the horizontal strip-shaped ribs are disposed at the depression in the present invention. On one hand, because the depression is disposed, the strength of the middle of the lower shell is greatly decreased, while in the present invention, the strip-shaped ribs are disposed to increase the strength of the depression position. On the other hand, the strip-shaped ribs are disposed to increase a frictional force, so that the user conveniently holds the middle of the self-balancing scooter with hands.

Figure 1:
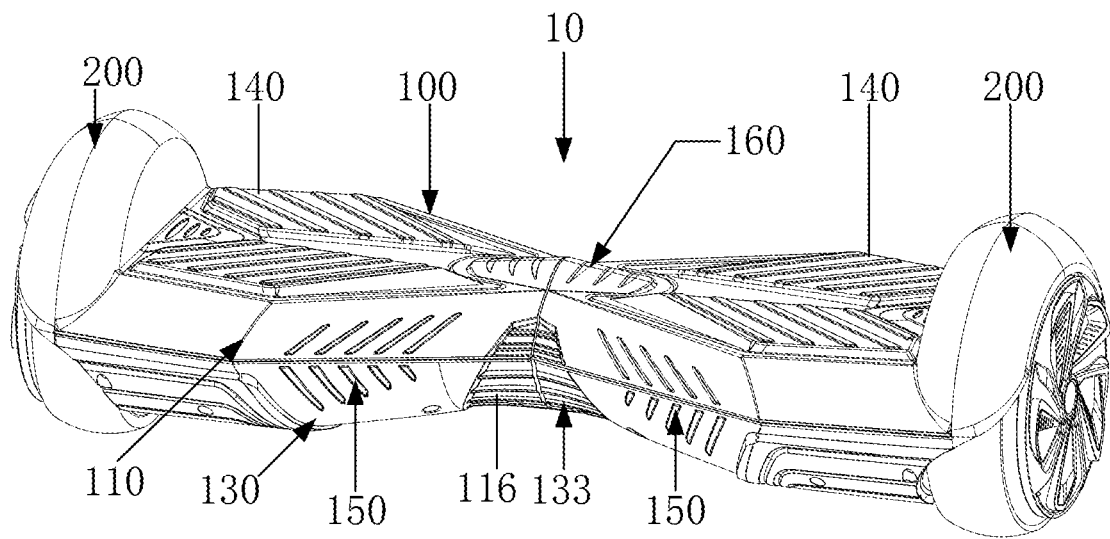
FIG. 1 is an overall structural schematic diagram of a self-balancing scooter according to an embodiment of the present invention.
Figure 2:
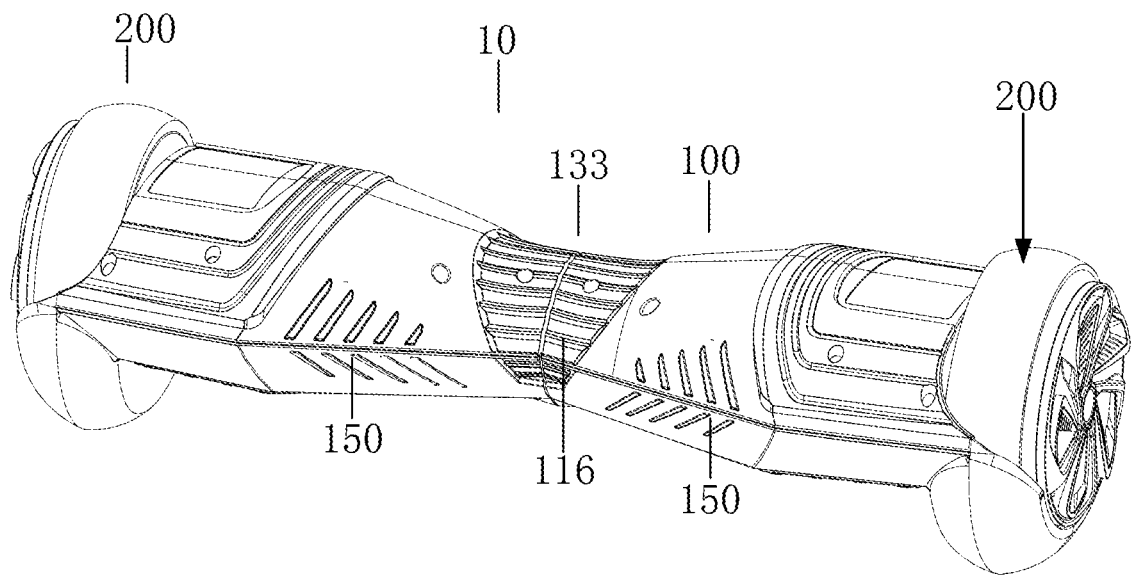
FIG. 2 is also an overall structural schematic diagram of a self-balancing scooter according to an embodiment of the present invention.

In the figures: 10 self-balancing scooter; 11 light emitting lamp plate; 12 indicating lamp plate; 13 locating plate; 100 scooter body; 110 upper shell; 111 first upper shell; 112 second upper shell; 113 pedal hole; 114 lamp hole; 115 indicating lamp hole; 116 strip-shaped rib; 117 extending edge; 120 middle shell; 121 first middle shell; 122 second middle shell; 130 lower shell; 131 first lower shell; 132 second lower shell; 133 depression; 140 pedal; 141 first placing portion; 142 second placing portion; 143 connecting portion; 144 notch; 145 limiting ring; 146 anti-slip strip; 147 trigger element; 150 lampshade; 151 first plate; 152 second plate; 153 angle portion; 154 lamp strip; 155 convex portion; 156 concave portion; 157 bayonet; 160 lamp cover; 161 indicating strip; 162 lamp cover screw stud; 200 wheel; 210 rotating shaft; 220 rotating shaft fixing block; 300 power supply; 400 circuit board; 500 controller; 600 rotating mechanism; 610 bearing; 620 shaft sleeve; 630 limiting shaft; 700 fixing bracket; 710 blocking element; and 720 matching element.

DETAILED DESCRIPTION OF THE INVENTION

The present invention discloses a self-balancing scooter, comprising a scooter body, wheels, a driving motor for driving the wheels, a power supply for providing power, a circuit board provided with a sensor and a controller. The controller is electrically connected to the circuit board, the power supply and the driving motor respectively, wherein the scooter body comprises:

an upper shell comprising a first upper shell and a second upper shell disposed symmetrically and provided with pedal holes respectively;

pedals disposed in the pedal holes of the first upper shell and the second upper shell respectively;

a middle shell comprising a first middle shell and a second middle shell disposed symmetrically and rotatable mutually; and a lower shell comprising a first lower shell and a second lower shell disposed symmetrically. The middle shell is located between the upper shell and the lower shell. An outer surface of the middle of the lower shell is provided with a depression with an arc structure. A plurality of horizontal and spaced strip-shaped ribs are disposed on the lower shell on an outer surface of the depression.

The wheels are provided with rotating shafts. The two wheels are respectively fixed to both sides of the middle shell through the rotating shafts, and are rotatable around the middle shell.

A driving mechanism is disposed in the middle of the scooter body, and portions of the upper shell and the lower shell in the middle of the scooter body are used to cover the driving mechanism without needing large strength, so that an arc depression adapted to the scooter body structure is disposed in the middle position of the lower shell in the present invention. In this way, the size of the middle of the scooter body is decreased. Not only the user conveniently holds the scooter body with hands, but also a height from the middle of the scooter body to the ground is increased relatively, so as to better prevent the self-balancing scooter from touching an obstacle during running. In addition, the horizontal strip-shaped ribs are disposed at the depression in the present invention. On one hand, because the depression is disposed, the strength of the middle of the lower shell is greatly decreased, while in the present invention, the strip-shaped ribs are disposed to increase the strength of the depression position. On the other hand, the strip-shaped ribs are disposed to increase a frictional force, so that the user conveniently holds the middle of the self-balancing scooter with hands.

In the description of the present invention, it should be understood that orientations or position relationships indicated by terms "center", "transverse", "up", "down", "left", "right", "vertical", "horizontal", "top", "bottom", "inside" and "outside" are orientations or position relationships as shown on the basis of the accompanying drawings, and are only used to facilitate and simplify the description of the present invention, instead of expressing or implying that indicated apparatuses or elements must have specific orientations and be constructed and operated in the specific orientations, so these terms should not be understood as limiting the present invention. In addition, terms "first" and "second" are only for description, and should not be understood as expressing or implying relative importance or impliedly indicating the number of technical features. Therefore, features defined by "first" and "second" may explicitly or impliedly include one or more of these features. In the description of the present invention, unless otherwise specified, "a plurality of" means two or more than two. In addition, the term "include" and any variations of "include" are intended to cover non-exclusive inclusions.

In the description of the present invention, it should be noted that unless otherwise clearly specified and defined, terms "installing", "connected" and "connecting" shall be understood in a broad sense. For example, it may be fixed connection, and also may be detachable connection, or integrated connection. It may be mechanical connection, and also may be electric connection. It may be direct connection, and also may be indirect connection through intermediate. It may be communication of insides of two elements. Those ordinarily skilled in the art can understand specific meanings of the above-mentioned terms in the present invention according to specific situations.

The present invention will be further described below in combination with accompanying drawings and preferred embodiments.

A self-balancing scooter 10 in an embodiment of the present invention is described below by referring to FIG. 1 to FIG. 8.

As shown in FIG. 1 to FIG. 8, the self-balancing scooter 10 in the present embodiment comprises a scooter body 100, wheels 200, a driving motor for driving the wheels, a power supply 300 for providing power, a circuit board 400 provided with a sensor, a controller 500 and a light emitting lamp electrically connected to the power supply. The controller is electrically connected to the circuit board, the power supply and the driving motor respectively. The scooter body 100 comprises:

an upper shell 110 comprising a first upper shell 111 and a second upper shell 112 disposed symmetrically and provided with pedal holes 113 respectively;

two pedals 140 disposed in the pedal holes 113 of the first upper shell 111 and the second upper shell 112 respectively;

a middle shell 120 comprising a first middle shell 121 and a second middle shell 122 disposed symmetrically and rotatable mutually;

a lower shell 130 comprising a first lower shell 131 and a second lower shell 132 disposed symmetrically, wherein the middle shell is located between the upper shell and the lower shell; and a lampshade 150 sleeved around the light emitting lamp. The lampshade 150 is provided with at least two spaced lamp strips 154 for transmitting light. Correspondingly, lamp holes 114 for placing the lamp strips are formed in the scooter body. The quantity of the lamp holes 114 is identical with the quantity of the lamp strips 154.

The wheels 200 are provided with rotating shafts 210. The two wheels 200 are respectively fixed to both sides of the middle shell through the rotating shafts 210, and are rotatable around the middle shell. Specifically, the self-balancing scooter 10 further comprises two fixing blocks 220 used to limit the two rotating shafts 210 respectively. Rotating shaft grooves used to place the rotating shafts are formed in the middles of the fixing blocks 220, to facilitate rotation of the rotating shafts in the rotating shaft grooves of the fixing blocks. Moreover, the fixing blocks are installed and fixed to the middle shell through a plurality of screws, thereby ensuring firm fixation and convenient realization.

Thus, the scooter body 100 of the present embodiment has at least two lamp holes 114 when one lampshade 150 is installed and fixed on the scooter body 100. Compared with a structure in which one lamp hole 114 is formed to match with one lampshade 150, the present invention uses at least two lamp holes to place the lamp strips so that the size of a single lamp hole is decreased. In this way, at least two lamp holes are matched with the lamp strips. Thus, at least two lamp holes share an acting force used to install and fix the lampshade. Further, matching between a single lamp strip and a single lamp hole is tight. At least two lamp holes and lamp strips are fixed tightly, so that the lampshade is installed and fixed on the scooter body more firmly and is difficult to swing.

The lamp strips 154 are convex strip-shaped structures of the lampshade 150. The lamp holes 114 are configured to adapt to sizes of the lamp strips 154. The lamp strips are configured into the convex strip-shaped structures to facilitate disposal of the lamp holes with the strip-shaped structures. In this way, the lamp strips of the strip-shaped structures and the lamp holes of the strip-shaped structures are conveniently installed and matched. In addition, a matching and limiting effect of the lamp strips of the strip-shaped structures and the lamp holes of the strip-shaped structures is good, so that the lampshade has a better fixed connection and tightening effect for the upper shell and the lower shell. For those skilled in the art, the lamp strips in the present embodiment can also be configured into other structures. For example, the lamp strips are configured into arc structures, and the lamp holes are also configured into arc structures.

Chamfers are formed at tops of the lamp strips 154. The chamfers are formed at the tops of the lamp strips so that the lamp strips are conveniently inserted into the lamp holes.

Further, sizes of the lamp strips 154 from the tops to roots are gradually increased. The sizes of the roots of the lamp strips 154 adapt to the sizes of the lamp holes. The lamp strips are more conveniently inserted into the lamp holes. Connection between the lamp strips and the lamp holes is tight, so as to avoid generating a clearance.

In a preferred solution of the present embodiment, the upper shell 110 is provided with lamp holes 114 for placing one or at least two lamp strips 154. The lower shell 130 is provided with lamp holes for placing one or at least two lamp strips. The sum of the lamp holes of the upper shell and the lamp holes of the lower shell is identical with the quantity of the lamp strips. The lamp holes are respectively formed in the upper shell and the lower shell in the present embodiment. Thus, when a single lampshade is fixed, the lamp strips on the single lampshade are simultaneously placed into the lamp holes of the upper shell and the lamp holes of the lower shell. In this way, the lampshade plays a role of connecting the upper shell and the lower shell, so that connection between the upper shell and the lower shell is tighter and fixation is more firm.

Figure 4:
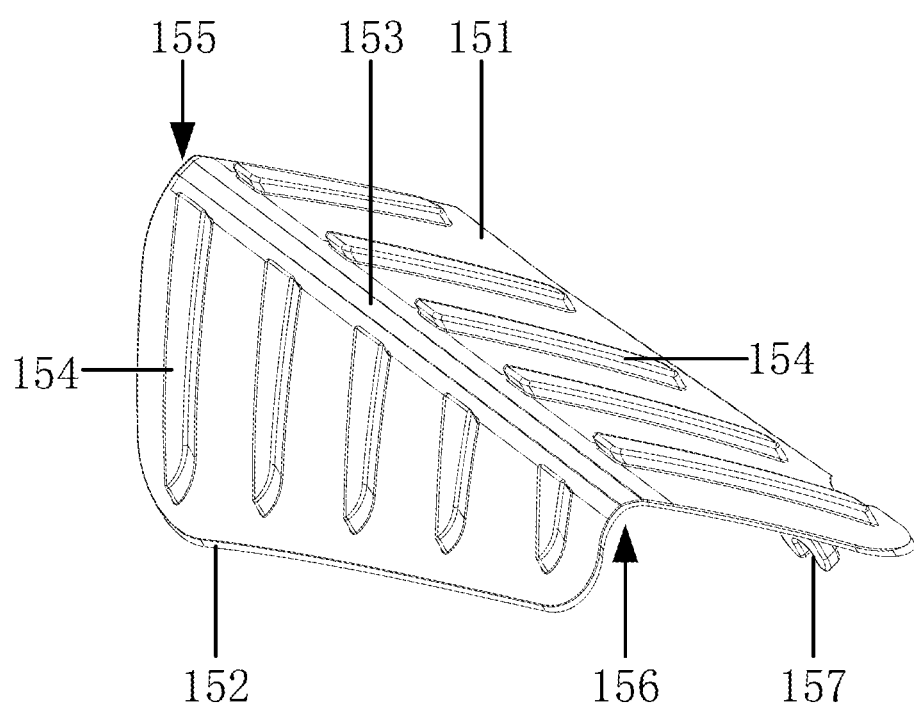
FIG. 4 is a structural schematic diagram of a lampshade according to an embodiment of the present invention.
Figure 5:
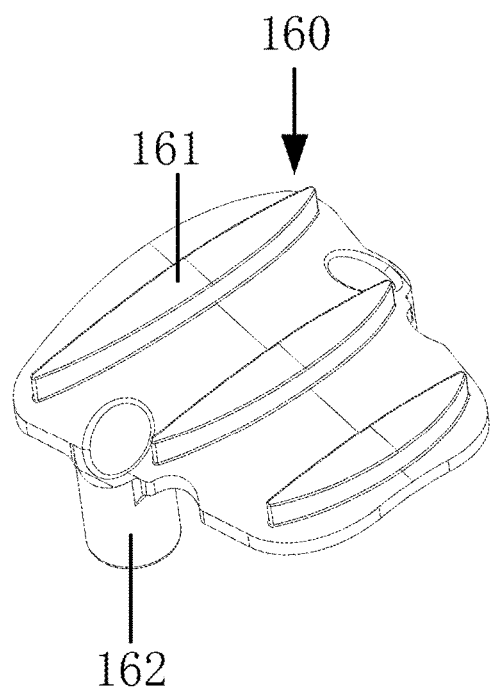
FIG. 5 is a structural schematic diagram of a lamp cover according to an embodiment of the present invention.
Figure 6:
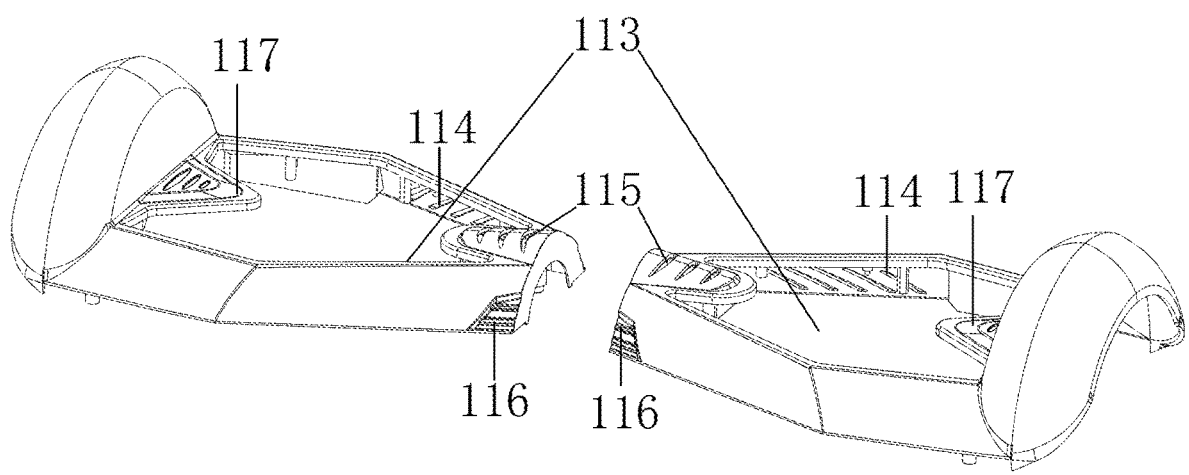
FIG. 6 is a structural schematic diagram of an upper shell according to an embodiment of the present invention.

In the present embodiment, as shown in FIG. 4, the lampshade 150 comprises a first plate 151, a second plate 152 and an angle portion 153 located between the first plate 151 and the second plate 152. An angle of the angle portion 153 is smaller than 180 degrees and greater than 90 degrees. The lamp strips 154 are located on the first 151 and the second plate 152. The lamp strips 154 on the first plate 151 are placed in the lamp holes of the upper shell 110. The lamp strips on the second plate 152 are placed in the lamp holes of the lower shell 130. This is a specific structure for arrangement of the lampshade in the present invention. Such arrangement enables intensity of the lampshade to be large. Moreover, when the upper shell is connected to the lower shell in a matching manner, a radian is formed between the upper shell and the lower shell. In the present invention, the lampshade is configured into an integral structure suitable for connection between the upper shell and the lower shell in a matching manner. Thus, the lampshade is conveniently connected to the upper shell and the lower shell respectively in a matching manner. When connected to the upper shell and the lower shell respectively in a matching manner, the lampshade is tightly matched and the fixed connection effect is better.

Specifically, at least two lamp strips 154 are located on the first plate 151. At least two lamp strips 154 are located on the second plate 152. A larger quantity of the lamp strips realizes greater bearing capacity, so that the connection effect between the upper shell and the lower shell is better. This is a preferred solution of the present embodiment. Of course, in the present embodiment, one lamp strip may be disposed on the first plate, and one lamp strip may be disposed on the second plate. In addition, the quantity of the lamp strips on the first plate is identical with the quantity of the lamp strips on the second plate. Because the quantity of the lamp strips disposed on the first plate is identical with the quantity of the lamp strips disposed on the second plate, the upper shell and the lower shell bear uniform stress.

In the present embodiment, the lamp strips on the first plate and the lamp strips on the second plate are disposed symmetrically. Symmetrical arrangement ensures uniform stress. This is a preferred solution for disposing the lamp strips in the present embodiment. Of course, for those skilled in the art, the lamp strips can also be configured to be asymmetrical.

In the present embodiment, one end of the angle portion between the first plate and the second plate protrudes outwards to form a convex portion 155, and the other end sinks inwards to form a concave portion 156. The other end is close to a middle of the scooter body. The convex end of the lampshade is larger than the other end, and is gradually decreased. Because the middle of the scooter body is smaller than the sizes of both sides of the scooter body, such arrangement ensures that the lampshade is disposed to match with a scooter body structure and the lampshade has a better connection effect for the upper shell and the lower shell and larger intensity. This is a preferred solution for disposing the lampshade structure in the present embodiment. Of course, for those skilled in the art, the lampshade can also be configured into other structures. For example, both ends of the lampshade are configured into parallel structures with equal sizes.

An angle greater than or equal to 0 degree and smaller than 90 degrees is formed between the lamp strips 154 and the angle portion 153. This is a specific manner for disposing the lamp strips. Of course, the lamp strips can also be configured to be parallel to the angle portion.

Further, a length of the lamp strips on the first plate 151 is gradually increased from the convex end to the other end. A length of the lamp strips on the second plate 152 is gradually decreased from the convex end to the other end. A change amplitude of the length of the lamp strips on the second plate is greater than a change amplitude of the length of the lamp strips on the first plate. The upper shell is located in a position at the top of the scooter body. Because the pedal holes are formed in the middles of the first upper shell and the second upper shell of the upper shell, the lamp holes in the present invention are formed at edges of the first upper shell or/and the second upper shell. The change of the edge of the upper shell is small. In this way, change amplitude of the length of the lamp holes formed in the upper shell is small. Meanwhile, the lower shell is located at the bottom of the scooter body. The middles of the first lower shell and the second lower shell of the lower shell are used to place the power supply, the controller and other devices. The middles protrude greatly outwards, so that the lamp holes with small length are disposed in the middle of the lower shell close to the scooter body and the lamp holes with large length in the lamp holes of the lower shell are conveniently presented, so that a user sees light emitted from the lamp holes.

A size of one end, close to the angle portion 153, of the lamp strips 154 is larger than a size of the other end of the lamp strips. The lampshade in the present embodiment connects the upper shell and the lower shell through the lamp strips on the first plate and the second plate. When an outward tension is applied between the upper shell and the lower shell, one end, close to the angle portion, of the lamp strips is stressed. However, in the present embodiment, one end close to the angle portion is configured to be larger than the other end of the lamp strips. Thus, the lamp strips on the stressed end are larger, have stronger bearing capacity and realize better connection between the upper shell and the lower shell. This is a preferred solution for disposing the lamp strips. Of course, for those skilled in the art, in the present embodiment, the lamp strips can also be configured into other structures. For example, both ends of the lamp strips are configured into structures with equal sizes.

In the present embodiment, two light emitting lamps are disposed and are respectively installed and fixed on two light emitting lamp plates 11. The light emitting lamp plates 11 are electrically connected to the power supply 300 and the circuit board 400 respectively. Correspondingly, two lampshades 150 are also disposed. The two lampshades 150 are respectively matched with the two light emitting lamps. Specifically, the two lampshades 150 respectively cover outer portions of the two light emitting lamp plates 11, and play roles of limiting and protecting the light emitting lamp plates. In addition, the two lampshades in the present embodiment are symmetrically disposed, and the two light emitting lamp plates are symmetrically disposed. Moreover, the two lampshades are disposed at the same side of the scooter body, and located on both sides of the middle of the scooter body. It should be indicated that for those skilled in the art, the quantity of the light emitting lamps and the quantity of the lampshades disposed in the present embodiment are not limited to two. For example, only one light emitting lamp and only one lampshade are disposed. For example, three light emitting lamps and three lampshades are disposed.

In the present embodiment, the light emitting lamps are LED lamps. Namely, the LED lamps are disposed on the light emitting lamp plates 11, and have long life and good effect.

In the present embodiment, the light emitting lamps are strip-shaped structures. Specifically, the light emitting lamp plates are strip-shaped structures. The light emitting lamp plates 11 with the strip-shaped structures are conveniently installed and fixed into the scooter body. Of course, the light emitting lamps in the present embodiment can also be directly provided with one or more lamp beads. The lamp beads are installed and fixed into the lamp strips.

In the present embodiment, the light emitting lamps are installed and fixed into the scooter body through screws. Specifically, the light emitting lamp plates 11 are fixed into the scooter body through the screws. The screws are firm in fixation and convenient in installation, fixation and disassembly.

In the present embodiment, the driving motors are hub motors. Two hub motors are respectively disposed in the two wheels 200. However, in the present embodiment, the driving motors can also be disposed in the scooter body, and realize driving connection with the wheels trough the rotating shafts.

In the present embodiment, the first middle shell 121 and the second middle shell 122 are fixedly connected through the rotating mechanism 600. The first middle shell 121 and the second middle shell 122 realize mutual rotation through the rotating mechanism.

The rotating mechanism 600 is disposed in a middle position of a connection position between the first middle shell and the second middle shell. The rotating mechanism comprises a shaft sleeve 610, two bearings 620 and a limiting shaft 630. Both ends of the shaft sleeve are respectively fixed to inner ends of the first middle shell and the second middle shell. The two bearings 620 are fixed to the shaft sleeve 610 and fixed between the first middle shell and the second middle shell through a clamp spring. In this way, the first middle shell and the second middle shell of the middle shell are rotatable under the matching of the rotating mechanism 600. In addition, the limiting shaft 630 plays the roles of limiting and fixation.

It should be indicated that the rotating mechanism, the circuit board and the controller can adopt the prior art, such as the prior art given in the background, and will not be further described herein.

In the present embodiment, waterproof rings are disposed between the lamp strips 154 and the lamp holes 114. When the lamp strips are inserted into the lamp holes, the waterproof rings are pressed so that the lamp strips, the waterproof rings and the lamp holes are tightly matched to play a role of water prevention. Thus, when the self-balancing scooter of the present invention is used on a rainy day, rainwater is prevented from entering the scooter body from the lamp holes.

In the present embodiment, the waterproof rings are made of rubber material, and have good elasticity. Of course, the waterproof rings can also be made of other materials.

Further, the waterproof rings and the lamp strips are bonded through glue and the waterproof rings and the edges of the lamp holes are bonded through the glue. A sealing effect is better.

In the present embodiment, the waterproof rings are sleeved on the lamp strips to realize a waterproof effect. Specifically, the waterproof rings are provided with placing grooves for placing the lamp strips. The waterproof rings are sleeved on the lamp strips. The waterproof rings are sleeved on the lamp strips to realize a good waterproof effect. Of course, the lamp strips and the lamp holes can also be directly bonded through the glue to realize sealing and water prevention. However, in such arrangement, when the self-balancing scooter is greatly vibrated during rotation, the glue is easy to crack, causing that water prevention is impossible. In the present embodiment, the waterproof rings have elasticity, and generate deformation under vibration, so that the waterproof effect is still provided. In addition, in the present embodiment, the waterproof rings can also be sleeved on the lamp holes. For example, annular grooves for placing the edges of the lamp holes are formed at the edges of the waterproof rings. The edges of the waterproof rings are clamped to the edges of the lamp holes. Then, the lamp strips are inserted into the lamp holes and matched with the waterproof rings. When the lamp strips are inserted into the lamp holes, the lamp strips are pressed and fitted through the waterproof rings to realize a good waterproof effect. The waterproof effect can also be achieved.

In the present embodiment, the waterproof rings can also be disposed on indicating strips, so as to realize water prevention for the positions in a lamp cover and an indicating lamp.

In the present embodiment, the self-balancing scooter further comprises an indicating lamp electrically connected to the power supply 300. Specifically, the indicating lamp is disposed an indicating lamp plate 11. The scooter body 100 further comprises a lamp cover 160. The lamp cover 160 is used to protect the indicating lamp. Specifically, the lamp cover 160 covers an outer side of the indicating lamp plate 11, and limits and protects the indicating lamp plate 11. The indicating lamp is disposed at the end portion of the middle of the scooter body. In the present embodiment, the end portion of the scooter body faces a user (when the user uses the self-balancing scooter), and the lamp cover covers the indicating lamp. The indicating lamp comprises at least two lamp beads. The power condition of the power supply is displayed according to the quantity of the lamp beads. The lamp cover comprises at least two light transmitting indicating strips 161. The quantity of the indicating strips is identical with the quantity of the lamp beads. Each of the indicating strips is provided with one of the lamp beads.

In the present embodiment, the indicating lamp used to indicate the power state of the power supply is disposed in the middle of the scooter body, and is covered by the lamp cover. The lamp beads on the indicating lamp are respectively disposed on the indicating strips of the lamp cover, so that light emitted by the lamp beads is emitted outwards through the indicating strips to facilitate observation by the user. Moreover, at least two indicating strips are disposed in the present invention. Each indicating strip is matched with one lamp bead. When all the lamp beads emit light, it indicates that the power is sufficient. When the quantity of the lamp beads that emit light is gradually decreased, it indicates that the power of the power supply is decreased. Thus, the user can judge the power state of the power supply only by observing the quantity of the indicating strips that emit light, thereby greatly facilitating the use of the user.

In the present embodiment, the upper shell 110 is provided with indicating holes 115 used to place the indicating strips. The quantity of the indicating holes 115 is identical with the quantity of the indicating strips 161. When the indicating strips of the lamp cover are inserted into the indicating holes, the indicating strips are matched with the upper shell and are limited, so as to play a further limiting and fixing role on the lamp cover.

Further, the lamp cover 160 is fixed to the middle shell 120 through the screw. The screw is firm in fixation and convenient in installation and disassembly. In this way, the middle shell and the upper shell are further connected together, thereby further increasing connection strength between the upper shell and the middle shell. Specifically, by referring to FIG. 5, the lamp cover is provided with a lamp cover screw stud 162 used to penetrate through the screw to realize screwing fixation.

In the present embodiment, two lamp covers are disposed, respectively fixed to the first middle shell and the second middle shell and are disposed symmetrically. Correspondingly, two indicating lamp plates 12 are disposed, and are symmetrically installed and fixed on the first middle shell and the second middle shell. Such arrangement is more convenient for the user to know the power state of the power supply by observing the quantity of the indicating strips. This is a preferred manner for disposing the lamp covers and the lamp beads in the present embodiment. Of course, only one lampshade can also be disposed.

The size of the middle of each indicating strip is larger than the sizes of both ends of each indicating strip. The middle is configured to be large, and light emitting intensity is large, so that the user observes more conveniently.

The indicating strips are disposed in parallel. Such arrangement prevents the indicating strips from crossing each other. Once the indicating strips are crossed with each other, it is inconvenient for the user to distinguish the quantity of the indicating strips.

The indicating strips are arc structures. The indicating strips of the arc structures have better display effect. Of course, the indicating strips can also be configured into other structures, such as strip-shaped structures.

In the present embodiment, the waterproof rings can also be disposed on the indicating strips, so as to realize water prevention for the positions in the lamp cover and the indicating lamp.

For example, the waterproof rings are also disposed between the lamp strips 161 and indicating lamp holes 115. When the lamp strips are inserted into the indicating lamp holes, the waterproof rings are pressed so that the lamp strips, the waterproof rings and the indicating lamp holes are tightly matched to play a role of water prevention. Thus, when the self-balancing scooter of the present invention is used on the rainy day, rainwater is prevented from entering the scooter body from the indicating lamp holes.

In the present embodiment, the waterproof rings are made of rubber material, and have good elasticity. Of course, the waterproof rings can also be made of other materials.

Further, the waterproof rings and the lamp strips are bonded through glue and the waterproof rings and the edges of the lamp holes are bonded through the glue. A sealing effect is better.

In the present embodiment, the waterproof rings are sleeved on the indicating strips to realize a waterproof effect. Specifically, the waterproof rings are provided with placing grooves for placing the indicating strips. The waterproof rings are sleeved on the indicating strips. The waterproof rings are sleeved on the indicating strips to realize a good waterproof effect. Of course, the indicating strips and the indicating lamp holes can also be directly bonded through the glue to realize sealing and water prevention. However, in such arrangement, when the self-balancing scooter is greatly vibrated during rotation, the glue is easy to crack, causing that water prevention is impossible. In the present embodiment, the waterproof rings have elasticity, and generate deformation under vibration, so that the waterproof effect still provided. In addition, in the present embodiment, the waterproof rings can also be sleeved on the indicating lampholes. For example, annular grooves for placing the edges of the indicating lamp holes are formed at the edges of the waterproof rings. The edges of the waterproof rings are clamped to the edges of the indicating lamp holes. Then, the lamp strips are inserted into the indicating lamp holes and matched with the waterproof rings. When the indicating strips are inserted into the indicating lamp holes, the indicating strips are pressed and fitted through the waterproof rings to realize a good waterproof effect. The waterproof effect can also be achieved.

Figure 7:
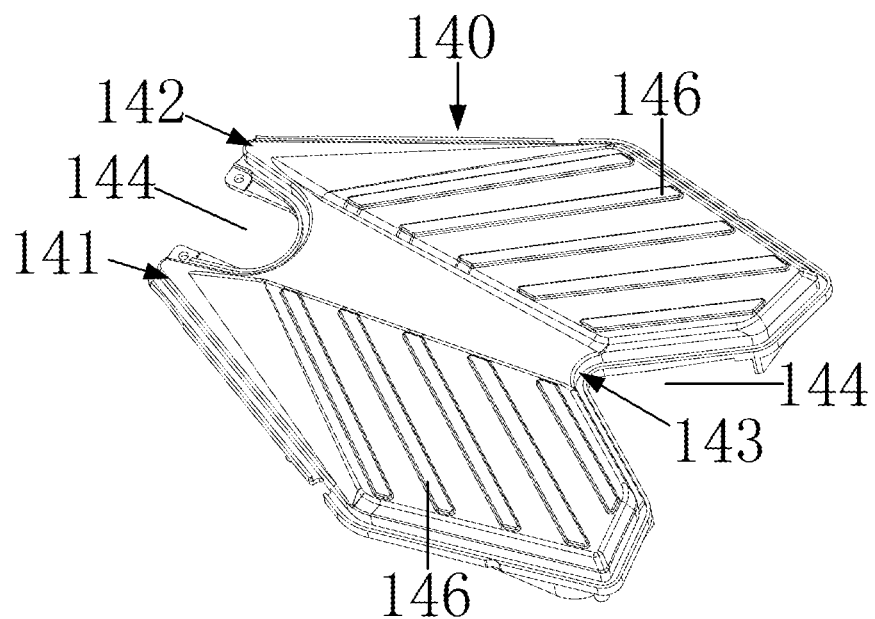
FIG. 7 is a structural schematic diagram of a pedal according to an embodiment of the present invention.
Figure 8:
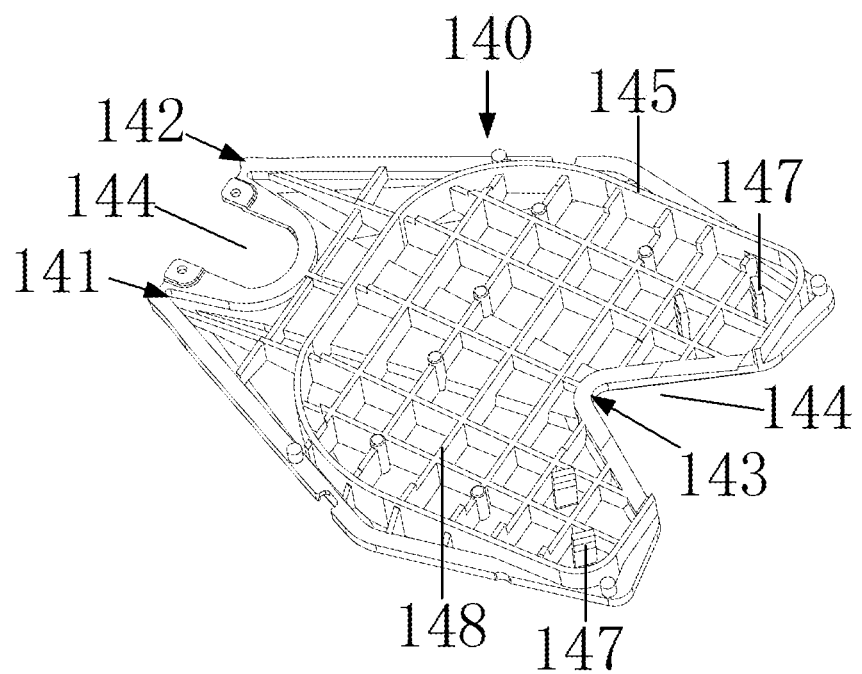
FIG. 8 is also a structural schematic diagram of a pedal according to an embodiment of the present invention.

In the present embodiment, as shown in FIG. 7 and FIG. 8, the two pedals 140 have the same structure and size, and are respectively disposed in the pedal holes 113 of the first upper shell 111 and the second upper shell 112. Each pedal 140 comprises a first placing portion 141 used to place a tiptoe position, a second placing portion 142 used to place a heel position, and a connecting portion 143 located between the first placing portion and the second placing portion. A length of the connecting portion 143 is smaller than a length of the first placing portion, and smaller than a length of the second placing portion. Two notches 144 are respectively formed in the first placing portion and the second placing portion at both ends of the connecting portion.

The upper shell 110 is provided with an extending portion 117 placed in a position of the notches 144. Because the user pedals front and rear end positions of the pedals mainly through tiptoes and heels when feet are placed on the pedals, the middles of the pedals are not pedaled by the feet of the user. In the prior art, the pedals are integrally configured into a rectangular structure. In this way, the middles of the pedals are greatly wasted, and large holes need to be formed in the middle shell and the upper shell to place the pedals. In the present invention, the connecting portions in the middles of the pedals are connected to the first placing portion and the second placing portion respectively. The length of the connecting portion is smaller than the length of the first placing portion, and smaller than the length of the second placing portion. Two notches are respectively formed in the first placing portion and the second placing portion at both ends of the connecting portion. In this way, the sizes of the middles of the pedals are greatly reduced. Meanwhile, the extending portion of the upper shell of the present invention is placed in the position of the notch of the pedal, thereby increasing an area of the upper shell and increasing the intensity of the upper shell. The middles of the pedals of the present invention are configured to be smaller than the front ends and the rear ends. In this way, the feet of the user are still convenient to pedal, thereby saving materials and production cost of the pedals. Meanwhile, the intensity of the upper shell is increased through the extending portion of the upper shell.

In the present embodiment, the first placing portion 141 and the second placing portion 142 are disposed symmetrically along the connecting portion 143. Symmetrical arrangement ensures that the first placing portion and the second placing portion bear uniform stress.

In the present embodiment, on outer surfaces of the pedals 140, a height of the connecting portion is smaller than a height of the first placing portion, and smaller than a height of the second placing portion. The height of the connecting portion is configured to be smaller than the height of the first placing portion and the height of the second placing portion, so as to prevent the connecting portion from protruding outwards and affecting the feet of the user for pedaling the pedals.

In the present embodiment, the notches 144 are arc structures. The arc structures have high strength, and are firm and convenient in matching.

In the present embodiment, a plurality of spaced anti-slip strips 146 are respectively disposed on the first placing portion and the second placing portion. The anti-slip strips are disposed to play an anti-slip role.

In the present embodiment, one end of the connecting portion is close to the middle of the scooter body, and the other end is close to one side of the scooter body. A size of one end of the connecting portion close to the middle of the scooter body is larger than a size of the other end, and is gradually decreased. This is a specific manner for disposing the pedals.

In the present embodiment, an extending edge is extended on the upper shell at the edge of the extending portion. When the pedals are placed into the pedal holes, the edges of the pedals are fitted onto the extending edge. The pedals are fitted onto the extending edge of the upper shell, so that the upper shell and the pedals have better fixed connection effect and higher strength.

Figure 3:
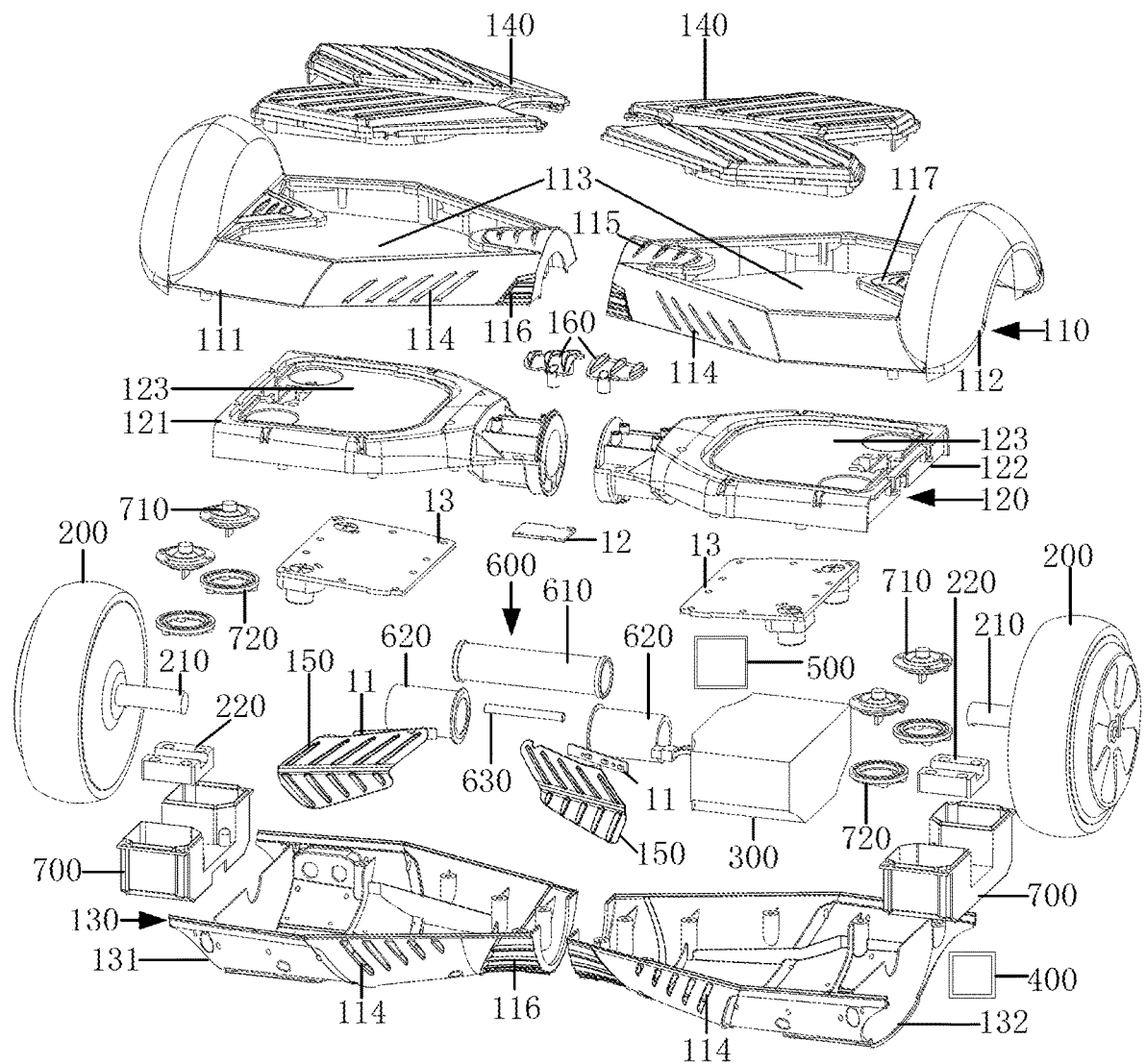
FIG. 3 is an exploded schematic diagram of a self-balancing scooter according to an embodiment of the present invention.

In the present embodiment, the middle shell is provided with pedal grooves 123 used to place the pedals, as shown in FIG. 3. The placing grooves have a limiting role for the pedals. Meanwhile, compared with a case of directly forming holes in the middle shell to place the pedals, the present embodiment greatly increases the strength of the middle shell.

In the present embodiment, inner surfaces of the pedals are provided with limiting rings 145. When the pedals are placed into the pedal grooves, the limiting rings are fitted with side walls of the pedal grooves. The limiting rings are matched with the pedal grooves to further increase firmness of fixed connection between the pedals and the middle shell.

In the present embodiment, a plurality of crossed reinforcing ribs 148 are disposed on the pedals in the limiting rings. The reinforcing ribs are disposed to increase the strength of the pedals.

In the present embodiment, the self-balancing scooter further comprises two fixing brackets 700. The fixing brackets 700 are respectively installed and fixed on both sides of the scooter body, i.e., disposed near the two wheels. In the present embodiment, fixing blocks are limited to the fixing brackets. Positions of both ends of each fixing bracket are used to install and fix two blocking elements 710 and two matching elements 720. The matching elements have a role of limiting the blocking elements to ensure that the blocking elements are stably limited in the fixing brackets. In the present embodiment, trigger elements 147 are disposed on bottom surfaces of the pedals 140 in positions corresponding to the blocking elements. When the user pedals the pedals 140 and applies a force to the pedals, the pedals trigger the blocking elements through the trigger elements 147 so that the stressed blocking element is in a combining state. Not only the hub motors are started to operate, but also a stressed condition of the stressed blocking element is analyzed through the circuit board and the controller. Based on this, speed and balance of the self-balancing scooter are controlled so that the user conveniently controls the self-balancing scooter.

The trigger elements 147 are disposed on both sides of one notch 144 of the pedals, i.e., located at one end of the first placing portion and one end of the second placing portion. In this way, the trigger elements are disposed in corner positions. Thus, when the pedals are pedaled by the user, the connecting portion is used as a rotating shaft to control the pedal, so as to control a cooperation relationship between the trigger elements and the blocking elements on the pedals. Because the connecting portion 143 in the present embodiment is configured to be smaller than the first placing portion and the second placing portion, sensitivity of pedaling the pedals by the user is greatly increased and the user controls the self-balancing scooter through the pedals more conveniently.

In the present embodiment, the self-balancing scooter further comprises a locating plate 13. The locating plate 13 is provided with a channel adapted to the blocking elements. In this way, the blocking elements are located in the channel of the locating plate 13 and are difficult to move. Thus, the trigger elements are convenient in trigger and are sensitive in trigger.

In the present embodiment, an outer surface of the middle of the lower shell 130 is provided with a depression 133 with an arc structure. A plurality of horizontal and spaced strip-shaped ribs 116 are disposed on the lower shell on an outer surface of the depression 133. A driving mechanism is disposed in the middle of the scooter body, and portions of the upper shell and the lower shell in the middle of the scooter body are used to cover the driving mechanism without needing large strength, so that an arc depression adapted to the scooter body structure is disposed in the middle position of the lower shell in the present invention. In this way, the size of the middle of the scooter body is decreased. Not only the user conveniently holds the scooter body with hands, but also a height from the middle of the scooter body to the ground is increased relatively, so as to better prevent the self-balancing scooter from touching an obstacle during running. In addition, the horizontal strip-shaped ribs are disposed at the depression in the present invention. On one hand, because the depression is disposed, the strength of the middle of the lower shell is greatly decreased, while in the present invention, the strip-shaped ribs are disposed to increase the strength of the depression position. On the other hand, the strip-shaped ribs are disposed to increase a frictional force, so that the user conveniently holds the middle of the self-balancing scooter with hands.

Heights of the strip-shaped ribs 116 are lower than the height of the depression. In this way, the strip-shaped ribs are prevented from protruding out of the depression. In this way, a distance from the middle of the self-balancing scooter to the running ground is longer, so as to facilitate the self-balancing scooter to run and effectively prevent the self-balancing scooter from touching the obstacle during running.

A width of the depression 133 is gradually decreased from the middle of the lower shell to positions of both sides. Such arrangement ensures that the distance from the middle position located below the scooter body to the ground is longer and the effect of preventing the self-balancing scooter from touching the obstacle is better.

Further, the depression 133 on the lower shell 130 extends to the side portion of the upper shell 110, and the strip-shaped ribs 116 are also disposed on the upper shell 110 at the extending position of the depression of the lower shell. The depression extends to portion of the upper shell. In this way, the user holds the self-balancing scooter with hands more conveniently. In a holding process, the hands of the user hold the middle position of the lower shell. Thumb portions and middle finger portions extend to the middle position of the upper shell. In this way, the strip-shaped ribs are also disposed in the middle position of the upper shell so that the user holds the self-balancing scooter with hands more conveniently.

Sizes of the positions in which the strip-shaped ribs 116 are disposed on the upper shell 110 are smaller than sizes of the positions in which the strip-shaped ribs are disposed on the lower shell 130. Such arrangement ensures that the strip-shaped ribs fit hand shapes of the user.

The sizes of the positions in which the strip-shaped ribs are disposed on the scooter body are gradually increased from the middle position to the positions of both sides of the strip-shaped ribs. Such arrangement ensures that the position closer to the middle has a larger height from the ground in the self-balancing scooter. Thus, the effect of preventing the self-balancing scooter from touching the obstacle is better.

Top surfaces of the strip-shaped ribs are configured into arc structures. The arc structures are convenient for the user to hold and avoid injuring the hands of the user.

In the present invention, when the lampshade is installed and fixed, the lampshade is connected to the upper shell and the lower shell in a matching manner through the lamp strips of the lampshade. In this way, the upper shell and the lower shell are connected more tightly and fixed more firmly. However, in the present embodiment, a fixing structure can also be disposed on the lampshade to realize fixed connection with the upper shell or the lower shell, so as to further increase the strength of fixed connection between the lampshade and the upper shell or the lower shell. Thus, not only the lampshade is fixed firmly, but also the strength of fixed connection between the upper shell and the lower shell is further increased. To further increase the strength of fixed connection between the lampshade and the scooter body, for example, a lampshade fixing portion is also disposed on the lampshade 150 in the present embodiment. Correspondingly, a scooter body fixing portion fixedly connected to the lampshade fixing portion is disposed on the scooter body. Specifically, the lampshade fixing portion is disposed on a bayonet 157 in the lampshade. Correspondingly, the scooter body is provided with a clamping post matched with the bayonet 157. The clamping post can be disposed on the upper shell, can be disposed on the middle shell and can also be disposed on the lower shell. In the present embodiment, preferably, the clamping post is disposed on an inner surface of the upper shell.

The above is a preferred solution for disposing the lampshade in the present invention. Of course, other solutions can also be presented and can also solve the technical problem in the background. For example:

In another solution of the present embodiment, the lampshade is fixed to the upper shell, i.e., the lamp holes are formed in the upper shell, instead of the lower shell. The lamp strips on the lampshade are matched with the lamp holes in the upper shell, and the lampshade is located in a side portion position of the upper shell. One end of the lampshade is close to the middle of the self-balancing scooter and the other end is away from the middle of the self-balancing scooter. The length of the lamp strips is gradually increased from the end close to the middle of the self-balancing scooter to the other end. This is a specific manner for disposing the lamp strips. The middle position of the self-balancing scooter is connected through the rotating mechanism. The middle is configured to be smaller, and both ends are configured to be larger. Such arrangement ensures that the lamp strips are disposed to match with the scooter body structure and the user sees the light emitted by the light emitting lamp more conveniently. Moreover, in such arrangement, the lamp strips are configured to be longer in a larger position of the scooter body, and the lamp strips are configured to be shorter in a smaller position of the scooter body. The lamp strips are disposed to match with the scooter body structure, so that the lampshade and the scooter body are matched more tightly and fixed more firmly. Of course, the length of the lamp strips can also be configured in such a manner that the length from the end close to the middle of the self-balancing scooter to the other end is gradually decreased.

In another solution of the present embodiment, the lampshade is fixed to the upper shell, i.e., the lamp holes are formed in the upper shell, instead of the lower shell. The lamp strips on the lampshade are matched with the lamp holes in the upper shell, and the lampshade is located in an end portion position of the upper shell, i.e., the lampshade is disposed on an end surface of the scooter body, or the lampshade is disposed on a surface that faces persons. The lamp strips are arc structures. One end of the lampshade is close to the middle of the self-balancing scooter, and the other end is away from the middle of the self-balancing scooter. The length of the lamp strips is gradually decreased from the end close to the middle of the self-balancing scooter to the other end. This is a specific manner for disposing the lamp strips. When the lampshade is disposed on the end surface of the scooter body, i.e., when the lampshade is disposed on the surface that faces persons, the feet of a person pedal on the pedals. In this way, the lampshade is disposed in the middle position of the scooter body. The lamp strips close to the middle position of the end portion of the scooter body are configured to be large, so that the user sees the light emitted by the light emitting lamp more conveniently.

In another solution of the present embodiment, the lampshade is fixed to the lower shell, i.e., the lamp holes are formed in the lower shell, instead of the upper shell. The lamp strips on the lampshade are matched with the lamp holes in the lower shell, and the lampshade is fixed in a side portion position of the lower shell. One end of the lampshade is close to the middle of the self-balancing scooter, and the other end is away from the middle of the self-balancing scooter. The length of the lamp strips is gradually increased from the end close to the middle of the self-balancing scooter to the other end. This is a specific manner for disposing the lamp strips. The middle position of the self-balancing scooter is connected through the rotating mechanism. The middle is configured to be smaller, and both ends are configured to be larger. Such arrangement ensures that the lamp strips are disposed to match with the scooter body structure and the user sees the light emitted by the light emitting lamp more conveniently. Moreover, in such arrangement, the lamp strips are configured to be longer in a larger position of the scooter body, and the lamp strips are configured to be shorter in a smaller position of the scooter body. The lamp strips are disposed to match with the scooter body structure, so that the lampshade and the scooter body are matched more tightly and fixed more firmly. Of course, the length of the lamp strips can also be configured in such a manner that the length from the end close to the middle of the self-balancing scooter to the other end is gradually decreased.

The lamp holes 114 of the present invention are preferably through holes. Of course, the lamp holes can also be configured into blind holes, and the blind holes are configured into transparent, so that the user sees the light emitted by the light emitting lamp through the blind holes.

In addition, the indicating lamp holes 115 of the present invention are also through holes. Of course, the indicating lamp holes can also be configured into blind holes, and the blind holes are configured into transparent, so that the user sees the light emitted by the indicating lamp through the blind holes.

The above contents are further detailed descriptions of the present invention in combination with specific preferred embodiments. However, the concrete implementation of the present invention shall not be considered to be only limited to these descriptions. For those ordinary skilled in the art to which the present invention belongs, several simple deductions or replacements may be made without departing from the conception of the present invention, all of which shall be considered to belong to the protection scope of the present invention.

The invention claimed is:

1. A self-balancing scooter, comprising a scooter body, wheels, a driving motor for driving the wheels, a power supply for providing power, a circuit board provided with a sensor, and a controller, wherein the controller is electrically connected to the circuit board, the power supply and the driving motor respectively, wherein the scooter body comprises:

an upper shell comprising a first upper shell and a second upper shell disposed symmetrically and provided with pedal holes respectively;

two pedals disposed in the pedal holes of the first upper shell and the second upper shell respectively;

a middle shell comprising a first middle shell and a second middle shell disposed symmetrically and rotatable mutually; and a lower shell comprising a first lower shell and a second lower shell disposed symmetrically, wherein the middle shell is located between the upper shell and the lower shell; an outer surface of a middle of the lower shell is provided with a depression with an arc structure; and a plurality of horizontal and spaced strip-shaped ribs are disposed on the lower shell on the outer surface of the depression, wherein the wheels are provided with rotating shafts; and the two wheels are respectively fixed to both sides of the middle shell through the rotating shafts, and are rotatable around the middle shell.

2. The self-balancing scooter according to claim 1, wherein heights of the strip-shaped ribs are lower than the height of the depression.

3. The self-balancing scooter according to claim 2, wherein the self-balancing scooter further comprises a light emitting lamp; the scooter body further comprises a lampshade sleeved around the light emitting lamp; the lampshade is provided with at least two spaced lamp strips for transmitting light; correspondingly, the scooter body is provided with lamp holes for placing the lamp strips; and a quantity of the lamp holes is identical with a quantity of the lamp strips.

4. The self-balancing scooter according to claim 1, wherein a width, of the depression is gradually decreased from the middle, of the lower shell to positions of both sides.

5. The self-balancing scooter according to claim 4, wherein the depression on the lower shell extends to a side portion of the upper shell, and the strip-shaped ribs are also disposed on the upper shell at an extending position of the depression of the lower shell.

6. The self-balancing scooter according to claim 5, wherein the self-balancing scooter further comprises a light emitting lamp; the scooter body further comprises a lampshade sleeved around the light emitting lamp; the lampshade is provided with at least two spaced lamp strips for transmitting light; correspondingly, the scooter body is provided with lamp holes for placing the lamp strips; and a quantity of the lamp holes is identical with a quantity of the lamp strips.

7. The self-balancing scooter according to claim 5, wherein sizes of the positions in which the strip-shaped ribs are disposed on the upper shell are smaller than sizes of the positions in which the strip-shaped ribs are disposed on the lower shell.

8. The self-balancing scooter according to claim 7, wherein the self-balancing scooter further comprises a light emitting lamp; the scooter body further comprises a lampshade sleeved around the light emitting lamp; the lampshade is provided with at least two spaced lamp strips for transmitting light; correspondingly, the scooter body is provided with lamp holes for placing the lamp strips; and a quantity of the lamp holes is identical with a quantity of the lamp strips.

9. The self-balancing scooter according to claim 7, wherein the sizes of the positions in which the strip-shaped ribs are disposed on the scooter body are gradually increased from the middle position to the positions of both sides of the strip-shaped ribs.

10. The self-balancing scooter according to claim 9, wherein the self-balancing scooter further comprises a light emitting lamp; the scooter body further comprises a lampshade sleeved around the light emitting lamp; the lampshade is provided with at least two spaced lamp strips for transmitting light; correspondingly, the scooter body is provided with lamp holes for placing the lamp strips; and a quantity of the lamp holes is identical with a quantity of the lamp strips.

11. The self-balancing scooter according to claim 4, wherein the self-balancing scooter further comprises a light emitting lamp; the scooter body further comprises a lampshade sleeved around the light emitting lamp; the lampshade is provided with at least two spaced lamp strips for transmitting light; correspondingly, the scooter body is provided with lamp holes for placing the lamp strips; and a quantity of the lamp holes is identical with a quantity of the lamp strips.

12. The self-balancing scooter according to claim 1, wherein top surfaces of the strip-shaped ribs are configured into arc structures.

13. The self-balancing scooter according to claim 12, wherein the self-balancing scooter further comprises a light emitting lamp; the scooter body further comprises a lampshade sleeved around the light emitting lamp; the lampshade is provided with at least two spaced lamp strips for transmitting light; correspondingly, the scooter body is provided with lamp holes for placing the lamp strips; and a quantity of the lamp holes is identical with a quantity of the lamp strips.

14. The self-balancing scooter according to claim 1, wherein the self-balancing scooter further comprises a light emitting lamp; the scooter body further comprises a lampshade sleeved around the light emitting lamp; the lampshade is provided with at least two spaced lamp strips for transmitting light; correspondingly, the scooter body is provided with lamp holes for placing the lamp strips; and a quantity of the lamp holes is identical with a quantity of the lamp strips.

15. The self-balancing scooter according to claim 14, wherein the upper shell is provided with lamp holes for placing one or at least two lamp strips; the lower shell is provided with lamp holes for placing one or at least two lamp strips; and the sum of the lamp holes of the upper shell and the lamp holes of the lower shell is identical with the quantity of the lamp strips.

16. The self-balancing scooter according to claim 15, wherein the lamp strips are convex strip-shaped structures of the lampshade; the lamp holes are configured to adapt to sizes of the lamp strips; chamfers are formed at tops of the lamp strips; sizes of the lamp strips from the tops to roots are gradually increased; the sizes of the roots of the lamp strips adapt to the sizes of the lamp holes; the lampshade comprises a first plate, a second plate and an angle portion located between the first plate and the second plate; an angle of the angle portion is smaller than 180 degrees and greater than 90 degrees; the lamp strips are located on the first plate and the second plate; the lamp strips on the first plate are placed in the lamp holes of the upper shell; the lamp strips on the second plate are placed in the lamp holes of the lower shell; at least two lamp strips are located on the first plate; at least two lamp strips are located on the second plate; a quantity of the lamp strips on the first plate is identical with a quantity of the lamp strips on the second plate; the lamp strips on the first plate and the lamp strips on the second plate are disposed symmetrically; one end of the angle portion between the first plate and the second plate protrudes outwards, and the other end sinks inwards; the other end is close to a middle of the scooter body; the convex end of the lampshade is larger than the other end, and is gradually decreased; an angle greater than equal to 0 degree and smaller than 90 degrees is formed between the lamp strips and the angle portion; a length of the lamp strips on the first plate is gradually increased from the convex end to the other end; a length of the lamp strips on the second plate is gradually decreased from the convex end to the other end; a change amplitude of the length of the lamp strips on the second plate is greater than a change amplitude of the length of the lamp strips on the first plate; and a size of one end, close to the angle portion, of the lamp strips is larger than a size of the other end of the lamp strips.

* * * * *